United States Patent [19]

Hamilton

[11] 3,837,671
[45] Sept. 24, 1974

[54] INFLATING MEANS FOR INFLATABLE VEHICLE RESTRAINT SYSTEMS

[75] Inventor: Brian K. Hamilton, Utica, Mich.
[73] Assignee: Allied Chemical Corporation, New York, N.Y.
[22] Filed: Nov. 6, 1972
[21] Appl. No.: 304,291

[52] U.S. Cl. ............... 280/150 AB, 9/314, 60/26.1, 222/3, 280/150 SB
[51] Int. Cl. ........................................... B60r 21/08
[58] Field of Search .... 280/150 AB, 150 SB; 9/314, 9/316; 5/348 R; 297/386, 390; 60/26.1

[56] References Cited
UNITED STATES PATENTS

| | | | |
|---|---|---|---|
| 2,202,415 | 5/1940 | Christopher | 9/316 |
| 3,146,460 | 9/1964 | Henderson | 280/150 AB |
| 3,643,971 | 2/1972 | Kushnick | 280/150 AB |
| 3,674,059 | 7/1972 | Stephenson | 280/150 AB |
| 3,682,498 | 8/1972 | Rutzki | 280/150 AB |
| 3,706,462 | 12/1972 | Lilly | 280/150 AB |

Primary Examiner—David Schonberg
Assistant Examiner—John P. Silverstrim
Attorney, Agent, or Firm—Roger H. Criss; Jonathan Plaut

[57] ABSTRACT

A compact inflating means which does not require a device to generate large quantities of gas or movable mechanical parts is provided for use with inflatable restraint systems for vehicles, particularly inflatable restraint systems of the inflatable band type. The inflating means comprises a source of pressurized gas and means to release the pressurized gas in response to an increase of the gas pressure as a result of the pressurized gas being heated. More particularly, the inflating means comprises containing means, pressurized gas stored within the containing means, sealing means normally preventing discharge of the pressurized gas from the containing means and capable of releasing the pressurized gas from the containing means in response to the pressure of the pressurized gas reaching a predetermined level, and heating means actuatable to heat the pressurized gas and thereby increase its pressure to at least the predetermined level, whereby the sealing means releases the pressurized gas.

9 Claims, 5 Drawing Figures

PATENTED SEP 24 1974  3,837,671

INFLATING MEANS FOR INFLATABLE VEHICLE RESTRAINT SYSTEMS

BACKGROUND OF THE INVENTION

1. Field of the Invention

This invention relates to inflating means for inflating vehicular restraints, such as inflatable bands.

2. Description of the Prior Art

Various inflating devices for inflatable vehicular restraint systems have been proposed. Some of the proposed inflating devices for air bag restraints include a pyrotechnic device to expand the bag via gas generated as a result of an explosion. For example, an electrical signal may be utilized to ignite a combustible solid, which generates a large quantity of gas and thereby expands the air bag. The combustible solid, which is referred to as the propellant, may comprise black powder. Such pyrotechnic devices create a danger of explosion in the event of malfunction and require cylinders having walls strong enough to resist the resultant explosive forces. Moreover, such devices necessitate the handling of hazardous materials. Other proposed inflating devices include those of the pressurized gas type in which a seal is ruptured thereby releasing the contained gas as a result of actuation of certain movable mechanical parts, such as plungers, etc. Inflating devices of this type are susceptible to malfunction of the movable mechanism and also must be of a relatively large size and weight to contain a sufficient volume of highly presurized gas.

It has recently been proposed to provide a vehicular restraint system which includes inflatable bands for positioning about the shoulder and lap portions of an occupant in a manner similar to present seat belt systems. U.S. Pat. application Ser. No. 290,917 of Donald J. Lewis, entitled "Vehicle Safety System," filed Sept. 21, 1972, discloses such a system. Such a system requires an inflating means which is capable of inflating the band within a very short period of time in order to protect the occupant from the effects of collisions, etc. Inflatable band type restraint systems may be designed to include inflating means positioned within the inflatable band itself or as part of a tongue portion or buckle portion of the seat belt buckle assembly. Inflating means of the type which is part of the buckle portion has been proposed in U.S. Pat. application Ser. No. 291,107, of Richard W. Lucore and Robert L. Stephenson, entitled "Seat Belt Buckle for Use With Inflatable Band," filed Sept. 21, 1972, now U.S. Patent 3,791,670.

It would be desirable to provide a compact inflating means for use with inflatable restraint systems, particularly of the band type, which does not require a device to generate large quantities of gas or moving parts and yet is capable of inflating the restraint within the necessarily short period of time.

SUMMARY OF THE INVENTION

In accordance with the present invention, a compact inflating means which does not require a device to generate large quantities of gas or movable mechanical parts is provided for use with inflatable restraint systems for vehicles, particularly inflatable restraint systems of the inflatable band type. The inflating means comprises a source of pressurized gas and means to release the pressurized gas in response to an increase of the gas pressure as a result of the pressurized gas being heated. More particularly, the inflating means comprises containing means, pressurized gas stored within the containing means, sealing means normally preventing discharge of the pressurized gas from the containing means and capable of releasing the pressurized gas from the containing means in response to the pressure of the pressurized gas reaching a predetermined level, and heating means actuatable to heat the pressurized gas and thereby increase its pressure to at least the predetermined level, whereby the sealing means releases the pressurized gas.

The inflating means is designed for use in an inflatable restraint system which also includes a sensing means to sense a predetermined condition of the vehicle, such as a collision, and thereby actuate the inflating means, and an inflatable restraint which is inflated by the inflating means. More particularly, in accordance with this invention there is provided an inflatable restraint system for vehicles which comprises an inflatable restraint, preferably an inflatable band, sensing means actuatable upon the occurrence of a predetermined condition of the vehicle, and inflating means for inflating the inflatable restraint comprising containing means, pressurized gas stored within the containing means, sealing means normally preventing discharge of pressurized gas from the containing means and capable of releasing pressurized gas from the containing means in response to the pressure of the pressurized gas reaching a predetermined level, and heating means responsive to actuation of the sensing means to heat the pressurized gas and thereby increase its pressure to at least the predetermined level, whereby the sealing means releases pressurized gas which inflates the inflatable restraint.

DESCRIPTION OF THE PREFERRED EMBODIMENT

Figure 1:
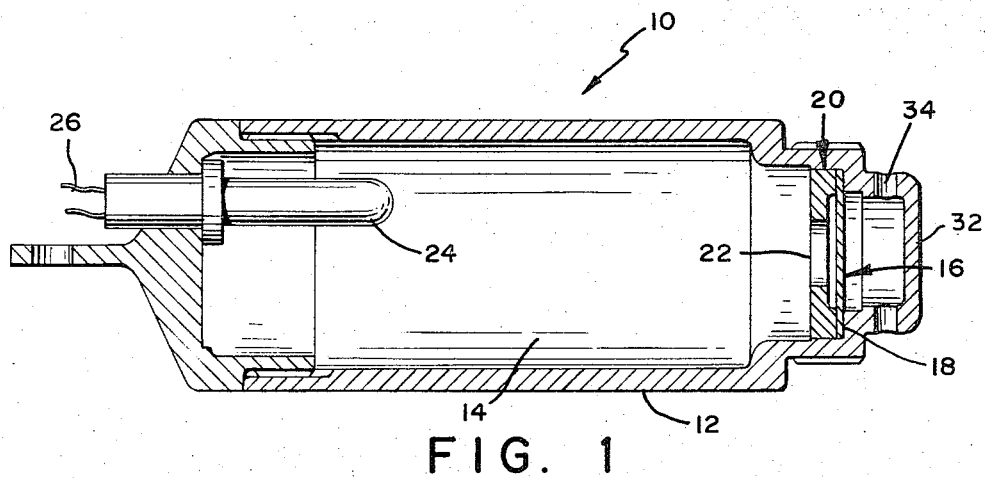
FIG. 1 shows a cross-sectional view of the inflating means of this invention.
Figure 2:
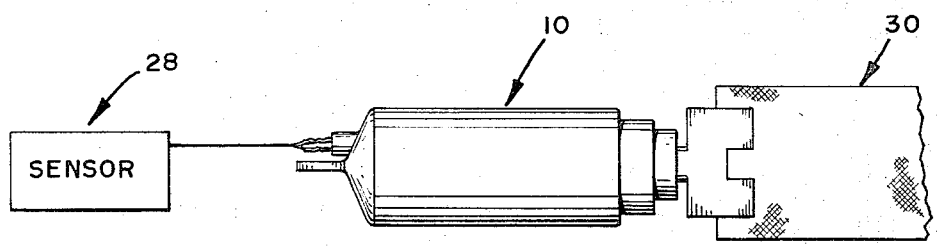
FIG. 2 shows in diagrammatic form the inflatable restraint system of this invention which includes the inflating means of this invention.

In accordance with a preferred embodiment of this invention, inflating means for an inflatable restraint system, particularly of the inflatable band type, is provided. Inflating means 10 comprises a normally sealed containing means, such as a gas cartridge 12, containing pressurized gas and heating means actuatable to increase the temperature of the gas to thereby increase its pressure to a level at which the seal is broken and the pressurized gas is released.

The gas cartridge 12 includes an interior storage chamber 14 within which a pressurized gas is stored. Although any gaseous substance may be employed, preferably the gas comprises an inert gas such as argon, neon, etc. A rupturable, burstable or frangible seal 16 is provided at one end of cartridge 12. Seal 16 normally seals the cartridge to prevent discharge of the pressurized gas but allows gas to pass from the cartridge when a predetermined pressure is reached within storage chamber 14 as is described hereinafter. This predetermined pressure is of course much less than the pressure which the walls of the cartridge are designed to withstand.

Seal 16 is preferably in the form of a disc formed of a material which is rupturable, burstable, frangible or otherwise is designed to release the stored gas at a predetermined pressure. For example seal 16 may be formed of a pressure-rupturable metallic disc, although of course other materials can be utilized. Seal 16 normally abuts against shoulder portions 18 provided at one end of gas cartridge 12 and prevents discharge of the stored pressurized gas.

Throttling means are preferably provided at a location adjacent to seal 16 to control the rate of flow of gas from cartridge 12 when such flow is desired, as is further explained below. The throttling means may comprise an orifice plug 20 preferably having a single centrally located orifice 22 therein, although a plurality of orifices may alternatively be provided. Also, orifice(s) 22 may be located other than at the center of orifice plug 20. Orifice plug 20 abuts against the internal wall of cartridge 12 and for this purpose the edges of the plug may be threaded so as to cooperate with threads provided on the internal wall of cartridge 12.

Seal 16 and plug 20 are desirably provided as a single unit which can be inserted at the end of cartridge 12 when the cartridge is filled with pressurized gas. Seal 16 may therefore suitably be fixed to plug 20 by welds or other means. Adjacent seal 16 there may be provided an outlet cap 32 which includes at least one outlet opening 34 and preferably is provided with a plurality of such openings.

Also provided in cartridge 12 is heating means preferably located at the opposite end of the cartridge from seal 16. Heating means comprises an electrically actuated squib 24 which is connected through electrical wires 26 to sensing means, as is explained below. Squib 24 may be any conventional ignition squib which ignites in response to an electrical signal. For example, squib 24 may include a high resistance bridging wire connected to wires 26 and an ignitable or combustible composition, such as a rapidly burning powder, contained in a suitable cannister. The ignitable composition is designed to burn within the cannister and release heat to the stored gas. The high resistance wire is capable of igniting the ignitable composition within a very short period of time after it receives an electrical signal, for example, on the order of 0.5 to 3 milliseconds.

Gas cartridge 12 is connected to an electrical circuit through wires 26 which circuit includes sensor 28. The electrical circuit may be part of the electrical circuit of the vehicle or independent thereof. Sensor 28 is capable of sensing or detecting a predetermined condition of the vehicle, such as a collision, generating an electrical signal is response thereto and transmitting such signal. As such sensors are known, they are not particularly described herein.

Although it is desired to actuate squib 24 by electrical means such as in response to an electrical signal from sensing means 28, alternatively squib 24 may be actuated by a mechanical means which is responsive to detection by the sensor of the predetermined vehicle condition (e.g., collision). Such mechanical means, which may be of the hydraulic type, may be connected to a suitable triggering device for igniting the squib, such as a firing pin. The mechanical means is utilized to actuate the squib and is not part of the internal workings of the cartridge itself. Since it may be desired to entirely exclude mechanically actuated means in the inflating mechanism of this invention, it is preferred to actuate squib 24 electrically.

The outlet opening(s) 34 communicates with an inflatable restraint, such as an inflatable band or air bag. Inflatable bands are preferred since cartridge 12 may be compact in size as it need only contain a relatively small volume of gas. An inflatable band system is disclosed, for example, in the aforementioned Lewis application. Such a system preferably includes separate shoulder and lap bands each of which are normally in the form of a collapsed tube folded on itself and capable of expanding into a generally tubular shaped restraint upon admission of gas interiorly of the band. Of course, a single band passing over both the shoulder and lap portions of an occupant may be employed or the band may only extend diagonally across the occupant's chest, as desired, or other band designs may be employed.

Figure 5:
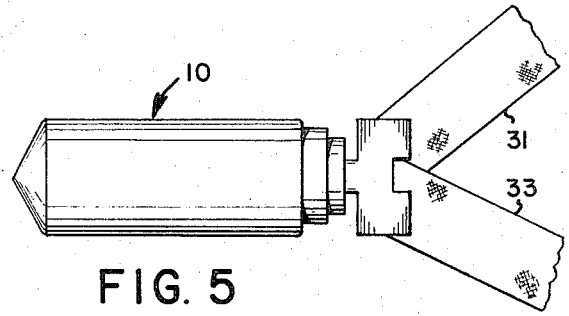
FIG. 5 shows in diagrammatic form still another embodiment of the invention wherein shoulder and lap bands are connected to a single inflating means.

If a plurality of bands is employed, a single gas cartridge may be used to inflate all or some of the bands or individual cartridges may be provided for each band or band section. It is preferred to inflate shoulder and lap bands from a single cartridge since this obviously minimizes requisite hardware. As shown in FIG. 5, lap band 31 and shoulder band 33 may be connected to a single inflating means 10. An example of a system in which a single cartridge is utilized to inflate both bands is disclosed in the aforementioned application of Lucore et al.

Figure 3:
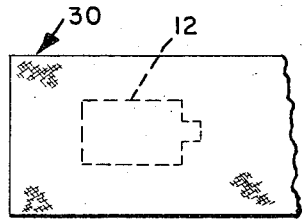
FIG. 3 shows in diagrammatic form one embodiment of the invention wherein an inflating means is located interiorly of an inflatable band.
Figure 4:
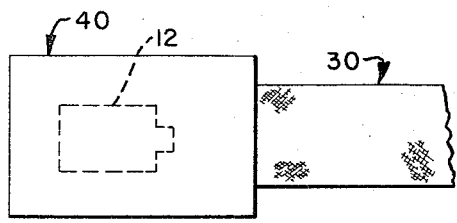
FIG. 4 shows in diagrammatic form another embodiment of the invention wherein an inflating means is located within a buckle assembly.

Gas cartridge 12 communicates with the interior of an inflatable band so that gas released from the cartridge enters interiorly of the band and expands the same. Depending upon the system employed, gas cartridge 12 may be provided within the band itself and fixed therein by stitching, etc., or the cartridge may form part of a tongue or buckle portion of a seat belt buckle assembly in which case connecting means are provided to connect the cartridge with the band. In the former case (FIG. 3), gas cartridge 12 shown in dotted lines may be located interiorly of band 30. In the latter case (FIG. 4), gas cartridge 12 shown in dotted lines may be included in buckle assembly 40 which is connected to band 30. Of course, gas cartridge 12 may be located in other areas of the vehicle.

In operation, sensing means 28, which is preferably collision (impact)-responsive, detects a collision and transmits an electrical impulse to gas cartridge 12. Electrical wires 26 receive such signal and actuate squib 24 to ignite the ignitable composition. Gas cartridge 12 contains gas (e.g. argon) which has been pressurized to a desired level. When the ignitable composition of squib 24 burns, the heat released thereby is transferred to the stored gas and as a result raises the temperature of the gas. That is, the squib is utilized as a source of heat to heat up the stored gas. Since the volume of the stored gas is constant, the temperature rise results in a corresponding increase in the gas pressure. Squib 24 heats the stored gas without generating a large quantity of additional gas. Although some gas may be released during combustion of the ignitable composition, the heat release thereby is the predominate factor in raising the pressure within the cartridge.

When a predetermined pressure level is reached within storage container 14, which level corresponds to the rupture point of seal 16, seal 16 ruptures and allows the pressurized gas to escape from the gas cartridge 12 and enter inflatable band 30 via outlet opening(s) 34. As a result of hot gas surging through opening(s) 34, band 30 is expanded to its inflated condition. The escaping gas must pass through orifice plug 20 which acts in a manner of a nozzle and meters the rate of flow of the gas into the band. The size of orifice 22 can be changed to control how rapidly the band inflates. Since it is necessary that the band be inflated within a very short period of time after a collision occurs, squib 24 must be capable of heating up the volume of stored gas to achieve the predetermined pressure level in a very short period of time so that seal 16 ruptures shortly after detection of a collision by sensor 28.

Since with an inflatable band system the volume of gas required to inflate the bands need not be very large, gas cartridge 12 may be manufactured in a compact size. For example, the fill volume of the inflatable bands may be in the order of about 1000 cubic inches and it may be desired to achieve a gauge pressure of about 8 pounds per square inch (psi) in the inflated band. Gas cartridge 12 may be designed to store 5 cubic inches of gas. In this case, the gas may be initially pressurized to a pressure of about 3000 psi and the seal 16 selected to burst at a pressure in the order of about 4500 psi. Squib 24 may be chosen to be capable of raising the pressure in the gas cartridge to about 5000 psi within about 2 milliseconds after actuation. Of course, once the burst pressure is reached, the seal breaks and pressurized gas is released into the bands which thereby inflate.

It can be seen that the above-described apparatus is capable of inflating an inflatable restraint within a very short period of time after the occurrence of an accident. This is especially important in systems employing inflatable bands since such bands should be capable of inflation prior to any substantial forward movement of the wearer as a result of the collision forces, which occur shortly after a collision.

In addition, it should be apparent that the inflating means of this invention is compact in size and does not require a propellant to generate large quantities of gas or movable mechanical parts.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:

1. An inflatable restraint system for vehicles comprising:
   A. an inflatable restraint comprising an inflatable band adapted to be positioned about the body of an occupant in an uninflated state;
   B. sensing means actuatable upon the occurrence of a predetermined condition of the vehicle; and
   C. inflating means responsive to actuation of said sensing means for inflating said inflatable restraint, said inflating means comprising:
      a. containing means comprising a gas cartridge,
      b. pressurized gas stored within said cartridge,
      c. sealing means comprising a pressure-rupturable seal normally preventing discharge of said pressurized gas from said cartridge and capable of releasing said pressurized gas from said cartridge in response to the pressure of said pressurized gas reaching a predetermined level, and,
      d. heating means consisting solely of a squib located within said cartridge and responsive to actuation of said sensing means to heat said pressurized gas, without generating a large quantity of additional gas, and thereby increase its pressure to at least said predetermined level, whereby said sealing means releases said pressurized gas and inflates said inflatable band.

2. An inflatable restraint system in accordance with claim 1 wherein said heating means is electrically actuatable and said sensing means, upon the occurrence of said predetermined condition, detects said condition and transmits an electrical signal in response to such detection to actuate said heating means.

3. An inflatable restraint system in accordance with claim 1 wherein said containing means includes throttling means to control the rate of flow of gas from said cartridge.

4. An inflatable restraint system in accordance with claim 3 wherein said throttling means comprises an orifice plug having an opening therein.

5. An inflatable restraint system in accordance with claim 1 wherein said inflating means is located interiorly of said inflatable band.

6. An inflatable restraint system in accordance with claim 1 wherein said inflatable band is connected to a buckle assembly which includes said inflating means.

7. An inflatable restraint system in accordance with claim 1 wherein said inflatable restraint comprises inflatable bands adapted to be positioned about the lap and shoulder portions of an occupant and wherein a single inflating means is provided to inflate said inflatable bands.

8. Inflating means for use with an inflatable restraint system comprising an inflatable band adapted to be positioned about the body of an occupant in a vehicle in an uninflated state, said inflating means being responsive to actuation of a sensing means actuatable upon the occurrence of a predetermined condition of said vehicle, said inflating means comprising containing means, pressurized gas stored within said containing means, sealing means normally preventing discharge of said pressurized gas from said containing means and capable of releasing said pressurized gas from said containing means in response to the pressure of said pressurized gas reaching a predetermined level, and heating means consisting solely of a squib located within said containing means and actuatable to heat said pressurized gas, without generating a large quantity of additional gas, and thereby increase its pressure to at least said predetermined level, whereby said sealing means releases said pressurized gas and inflates said inflatable band.

9. An inflatable restraint system in accordance with claim 2 wherein said squib is electrically actuable.

* * * * *